United States Patent [19]
Little

[11] Patent Number: 5,673,618
[45] Date of Patent: Oct. 7, 1997

[54] SCREW PRESS FLIGHT WITH WEAR RESISTANT SURFACE

[76] Inventor: Ramond P. Little, 150 Earline, Lafayette, La. 70506

[21] Appl. No.: 613,916

[22] Filed: Mar. 11, 1996

[51] Int. Cl.⁶ ........................................ B30B 3/00
[52] U.S. Cl. ................ 100/145; 100/98 R; 100/117; 198/676; 198/677; 366/322
[58] Field of Search .................. 100/98 R, 117, 100/145; 198/676, 677; 241/300; 366/64, 66, 318, 322; 425/168, 208; 494/53, 54

[56] References Cited

U.S. PATENT DOCUMENTS

| | | |
|---|---|---|
| 2,607,679 | 8/1952 | Weiss et al. ........................ 100/98 R |
| 3,592,128 | 7/1971 | French ................................ 100/145 |
| 3,764,062 | 10/1973 | Brautigam ........................... 198/676 |
| 3,937,317 | 2/1976 | Fleury, Jr. . |
| 4,223,601 | 9/1980 | Knuth et al. ........................ 100/117 |
| 4,398,607 | 8/1983 | Reichardt . |
| 4,466,533 | 8/1984 | Shwayder ............................ 198/677 |
| 4,519,496 | 5/1985 | Ludvigsen . |
| 4,949,836 | 8/1990 | Schostek . |
| 5,348,453 | 9/1994 | Baran et al. . |

*Primary Examiner*—Stephen F. Gerrity
*Attorney, Agent, or Firm*—Robert Montgomery

[57] ABSTRACT

A screw flight element of a mechanical screw press for expressing liquids from fibrous material such as may be found in rendering operations and a method of remanufacture thereof and the product produced by the method. The helical flight section is one of several having different pitches used in such screw presses and is equipped with carbide elements spaced at strategic points along the periphery of the helical section and further surrounded with plasma arch welded cladding, thereby providing wear and shear points which are harder than the surrounding cladding which is in turn harder than the base material.

11 Claims, 3 Drawing Sheets

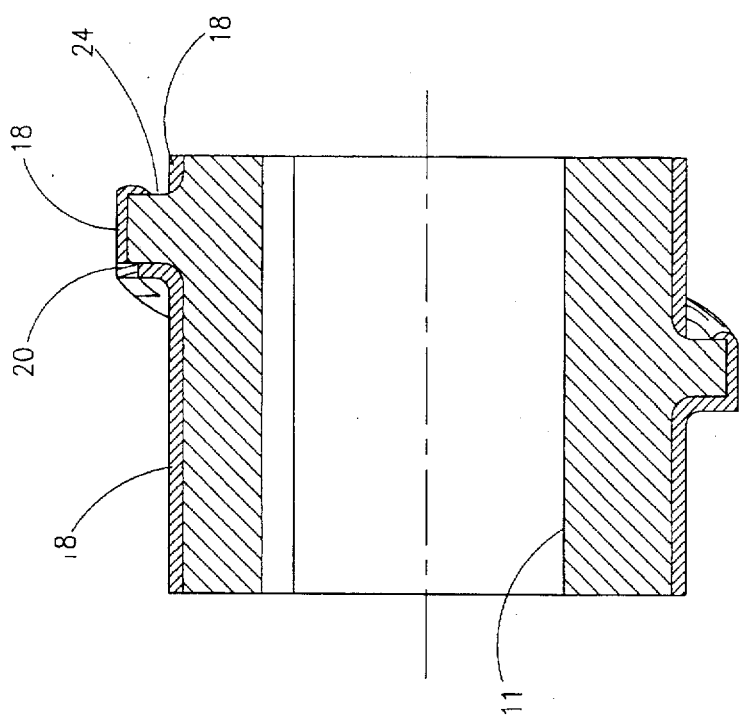
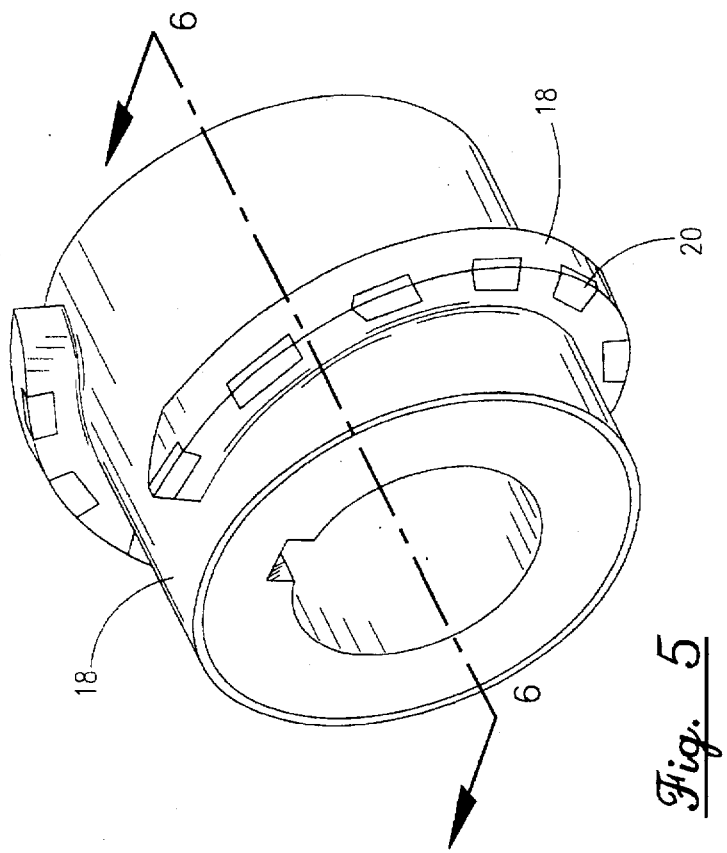

SCREW PRESS FLIGHT WITH WEAR RESISTANT SURFACE

BACKGROUND OF THE INVENTION

1. Field of the Invention

The invention relates to screw presses for expressing fluids from fibrous materials such as may be encountered in rendering presses, and more particularly, to a method of improving their wear resistance.

2. General Background

Screw presses, in general, and, more particularly presses subjected to high volume and high stress, such as that encountered by rendering presses, utilize armoring comprised of built up layers of hard surface material deposited by flame or plasma spraying and welding, to reduce the abrasive wear along the hub and flighting. A balance must be struck between the hardness of the flighting and that of the inner surface of the screw press cylinder. If the screw is too hard, excessive wear will result on the cylinder. However, it is essential that the screw exhibit maximum wear characteristics.

Hard surface layering typically comprises alloys of cobalt or nickel containing carbon, tungsten, chromium, boron and silicon in varying proportions. In some cases tungsten carbide has been added as a wear resistance layer.

Various methods have been devised for attaching wear plates to screw auger flights such as U.S. Pat. Nos. 4,398,607; 4,519,496; 5,348,453; 3,937,317; and 4,949,836. U.S. Pat. Nos. 5,348,453 and 4,949,836 rely on welded or plasma arc cladding while the remaining patents rely on mechanical retainment for hard surface members. Most such hard surface attachments have been used with screws having large flight to hub ratios and relatively thin flights. Cladding on the other hand lends itself to flighting having thick, heavy helical coils such as may be found in screw presses. In most cases the cladding is placed at extreme wear points. However, some presses such as those used in rendering presses, exhibit high hub wear as well as helical coil wear. Therefore, cladding generally covers both the coil and the hub portions equally. As a result wear life is increased but deteriorates unequally.

It is also well known in the industry that cutting tools often have carbide cutting tips soldered to the tool. Such tools exhibit excellent cutting characteristics but have a tendency to chip easily and separate from the tool.

None of the known technology discloses a method of controlling the hardness of specific wear points within the cladding process. In some cases it is desirable to have the leading edge crest of a screw flight exhibit a much harder surface than the surrounding cladded surfaces. Simply changing the formulation for the cladding material in a specific area results in inadequate adhesion contributing to chipping and limited peeling separations.

SUMMARY OF THE PRESENT INVENTION

It is an object of the present invention to provide an armored screw for a rendering press having a bonded coating comprising a wear-resisting composition in combination with solid carbide strips. The strips contain about 12% cobalt and are secured to the base metal by nickel silver and surrounded with layered plasma arc welded cladding on three sides thereby providing the screw flighting with a high intensity cutting edge. This cutting edge, while preventing excessive wear on the crest of the flight's leading face where it is the most critical, still maintains the wear balance between the screw hub and cylinder. Bonding a solid, carbide element to the base metal of the screw flight's helical coil and surrounding it with layered cladding forms a structural bond providing both wear and cutting strength.

BRIEF DESCRIPTION OF THE DRAWINGS

For a further understanding of the nature and objects of the present invention, reference should be had to the following detailed description taken in conjunction with the accompanying drawings, in which, like parts are given like reference numerals, and wherein:

FIG. 5 is an isometric view of a hub section for a typical press screw showing the present invention with a hard, cladding coat.

FIG. 6 is a vertical cross section of the hub depicted in FIG. 5, taken along sight line 6—6.

DETAILED DESCRIPTION OF THE PREFERRED EMBODIMENT

Figure 2:
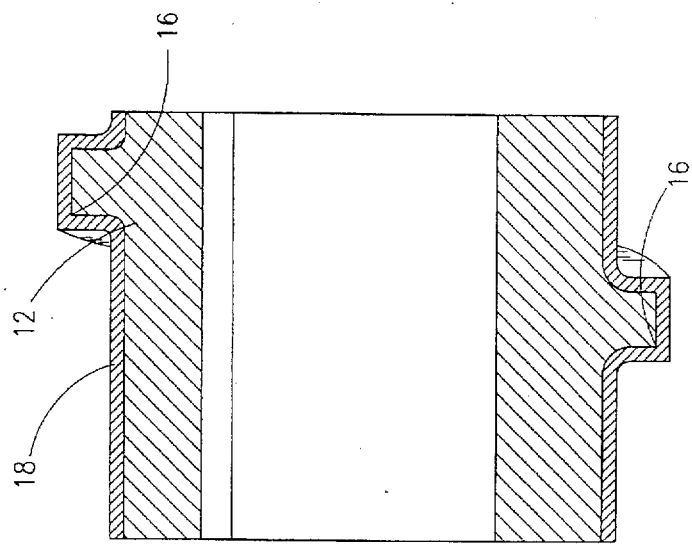
FIG. 2 is a vertical cross section of the hub depicted in FIG. 1, taken along sight line 2—2.
Figure 1:
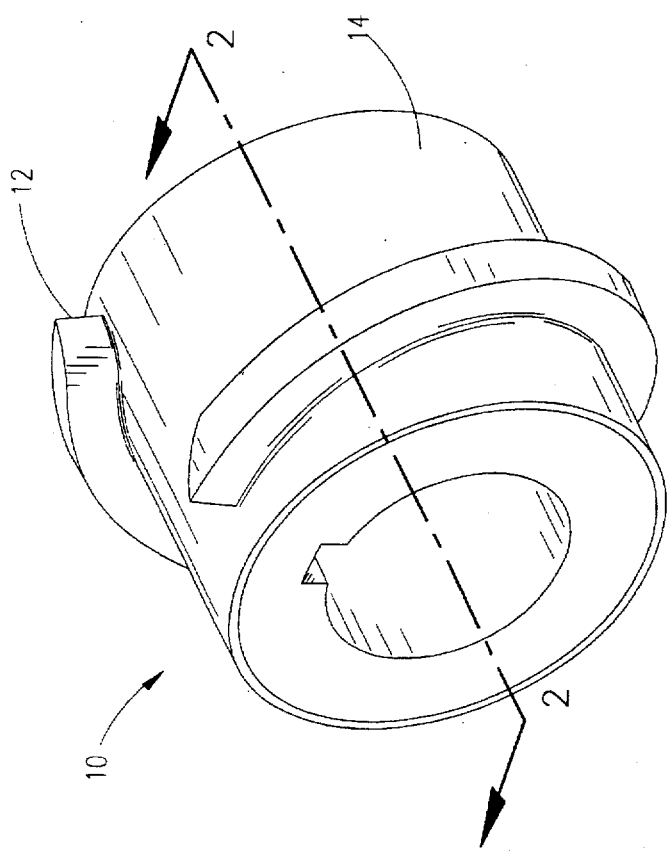
FIG. 1 is an isometric view of a hub section of a typical press screw.

In FIG. 1 the hub section 10 is simply one of several such hubs mounted on a screw arbor for use in a cylinder bore of a screw press. Each hub 10 has slightly different helical lands 12 (screw flighting) for moving material along the cylinder bore (not shown) between the hub outer diameter 14 and the cylinder wall of the press (not shown). As the material reaches the compaction end of the press, extreme wear takes place on both the O.D. 14 of the hub and the leading edge 16 of the helical lands 12. A cross section of the hub, as depicted in FIG. 2, shows how such hubs are generally cladded with a plasma arch welded, hard facing, material 18 of approximately three-eight's of an inch thick. The cladding 18 usually covers all of the exposed surface of the hub including the helical lands 12. This process provides a wear surface harder than the base material 11 but softer than the cylinder bore of the press (not shown).

Figure 4:
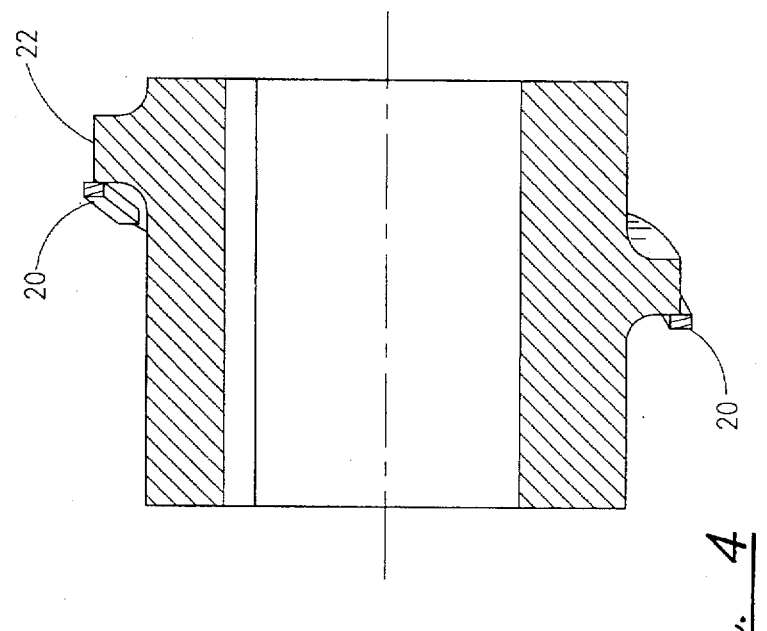
FIG. 4 is a vertical cross section of the hub depicted in FIG. 3, taken along sight line 4—4.
Figure 3:
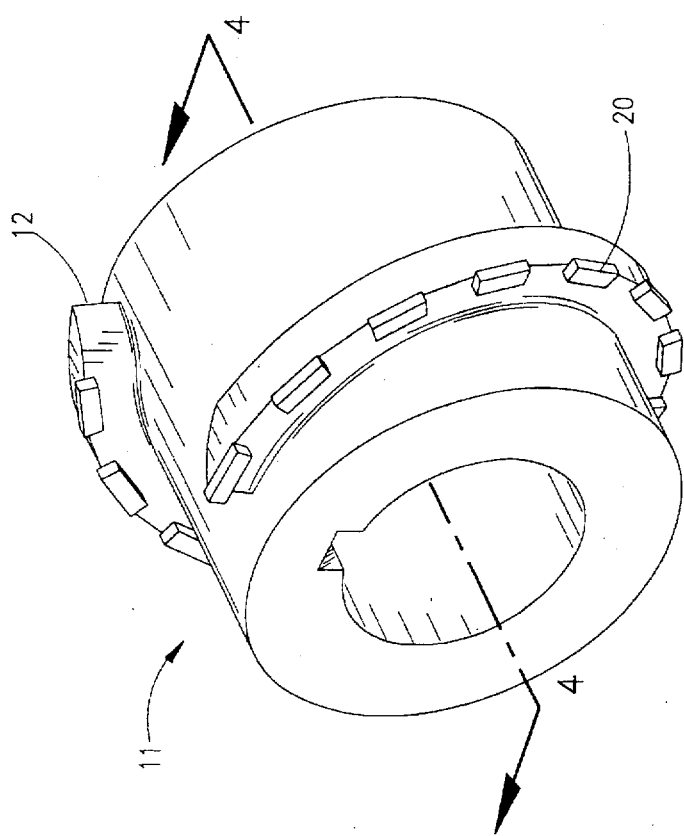
FIG. 3 is an isometric view of a hub section for a typical press screw showing the present invention.

The cladding 18 process alone makes no provision, other than thickness, for specific areas to have greater hardness than others. The present invention meets this objective by attaching a series of carbide elements 20 along the leading edge of the helical land 12 and extending slightly above the crest 22, as seen in FIGS. 3 & 4. The carbide elements 20, comprising approximately 12% cobalt, are attached to the base metal 12 of the hub's helical land 12 with nickel silver and spaced at regular intervals. The cladding material 18 process is then implemented as shown in FIGS. 5 & 6 thus building a hard layer approximately equal to the carbide element's 20 thickness over the remaining surface of the hub 10 and the leading edge 16 of the helical land 12 including the crest 22. However, in most cases, the back side 24 of the helical land need not be cladded since this area seldom shows much wear. The hub 10 is then ground to the desired finish dimensions. The effective life of the screw press hubs 10 has been shown to be more than twice that of cladded hubs having no solid carbide elements 20. Press hubs 10 having carbide elements also exhibit better cutting characteristics in handling foreign materials in the flow stream. It should also be noted that used or worn hubs may also be ground-down to the base metal and resurfaced in the manner disclosed herein.

Because many varying and different embodiments may be made within the scope of the inventive concept herein taught and because many modifications may be made in the embodiments herein detailed in accordance with the descriptive requirement of the law, it is to be understood that the details herein are to be interpreted as illustrative and not in any limiting sense.

What is claimed is:

1. A machine part subject to wear during use comprising:
   a) a steel base material configured as a rendering processing screw, exhibiting helical screw lands, each having a crest and leading face;
   b) a plurality of wear resistent carbide elements bonded to each leading face of said helical screw lands; and
   c) a wear resistant alloy cladding coated on and welded to all exposed surfaces of said base material by plasma powder deposition welding.

2. A machine part, as in claim 1, wherein said carbide elements extend slightly above said crest.

3. A machine part, as in claim 1, wherein said alloy cladding surrounds said carbide elements on at least three sides to a thickness approximating that of said carbide elements.

4. A machine part, as in claim 1, wherein said alloy cladding is omitted on faces of said helical lands opposite said leading face.

5. A machine part, as in claim 1, wherein said carbide elements comprise 12% total of cobalt.

6. A screw hub member for a rendering screw press comprising:
   a) a tubular hub portion having an internal bore and an external helical land portion with said helical land portion having a crest and a leading face;
   b) a plurality of carbide elements bonded to said leading face; and
   c) a wear resistant, alloy cladding comprised of plasma powder, deposited by welding of said alloy to all exposed surfaces of said tubular hub, to a thickness approximately equal to that of said carbide elements.

7. A machine part, as in claim 6, wherein said carbide elements extend slightly above said crest.

8. A machine part, as in claim 6, wherein said alloy cladding surrounds said carbide elements on at least three sides to a thickness approximate that of said carbide elements.

9. A machine part, as in claim 6, wherein said alloy cladding is omitted on a face of said helical land opposite said leading face.

10. A machine part, as in claim 6, wherein said carbide elements comprise 12% total of cobalt.

11. A materials press, screw element comprising:
    a) a hub having a helical element extending above its periphery;
    b) a row of generally rectangular wear-resistant elements secured to the operating surface of said helical element along the outer, contour thereof with their outer longitudinal edge faces following broadly said contour and protruding beyond the contour, and with their end faces extending generally in radial directions and in an incremental spaced apart relationship; and
    c) a wear resistant, alloy coated on and welded to all exposed surfaces of said hub including areas between said wear-resistant elements by plasma power deposition welding to a thickness approximate that of said wear-resistant elements.

* * * * *